United States Patent
Huang et al.

(10) Patent No.: US 6,877,359 B2
(45) Date of Patent: Apr. 12, 2005

(54) LIQUID LEAK DETECTION

(75) Inventors: Chin-Te Huang, Chiayi (TW); Hung Fa Chen, Kaohsiung (TW)

(73) Assignee: Taiwan Semiconductor Manufacturing Co., Ltd., Hsin Chu (TW)

(*) Notice: Subject to any disclaimer, the term of this patent is extended or adjusted under 35 U.S.C. 154(b) by 123 days.

(21) Appl. No.: 09/997,906

(22) Filed: Nov. 30, 2001

(65) Prior Publication Data

US 2003/0101799 A1 Jun. 5, 2003

(51) Int. Cl.[7] .................................................. G01M 3/04
(52) U.S. Cl. .................. 73/40; 73/861.18; 73/40.5; 340/605; 340/604
(58) Field of Search ............................ 73/40, 861.18, 73/40.5; 340/605, 604

(56) References Cited

U.S. PATENT DOCUMENTS

| | | | | |
|---|---|---|---|---|
| 3,382,493 A | * | 5/1968 | Loper, Jr. et al. | 340/604 |
| 3,564,526 A | * | 2/1971 | Butts | 340/524 |
| 3,864,676 A | * | 2/1975 | Macias et al. | 340/604 |
| 3,981,181 A | * | 9/1976 | Ochiai | 73/40.5 R |
| 4,206,632 A | * | 6/1980 | Suzuki | 73/40.5 R |
| 4,594,638 A | * | 6/1986 | Suzuki et al. | 361/280 |
| 4,677,373 A | * | 6/1987 | Kobayashi et al. | 324/700 |
| 4,805,662 A | * | 2/1989 | Moody | 137/312 |
| 4,877,923 A | * | 10/1989 | Sahakian | 73/40.5 R |
| 4,896,527 A | * | 1/1990 | Akiba | 73/40.5 R |
| 4,981,977 A | * | 1/1991 | Southwick et al. | 548/455 |
| 5,177,996 A | * | 1/1993 | Sahakian | 73/40 |
| 5,203,202 A | * | 4/1993 | Spencer | 73/40.5 R |
| 5,235,286 A | * | 8/1993 | Masia et al. | 324/522 |
| 5,410,255 A | * | 4/1995 | Bailey | 324/525 |
| 6,175,310 B1 | * | 1/2001 | Gott | 340/605 |

FOREIGN PATENT DOCUMENTS

GB          2276948 A     * 10/1994  ........... G01F/23/24

* cited by examiner

Primary Examiner—Hezron Williams
Assistant Examiner—André K. Jackson
(74) Attorney, Agent, or Firm—Tung & Associates

(57) ABSTRACT

Liquid leaks from a vessel cause shorts between at least one elongate sensing wire and another conductor when the fluid absorbs into the porous sheath of the sensing wire. The other conductor may comprise a second elongate sensing wire having similar porous sheath or a conductive tray or other conductive collection means. The sensing wire is placed in proximity to the vessel, such as beneath or immediately adjacent. Shorts are detected from the electrical characteristics of a circuit including the sensing wire and location is determined therefrom.

22 Claims, 3 Drawing Sheets

LIQUID LEAK DETECTION

TECHNICAL FIELD

The present invention is generally related to liquid leak detection. More particularly, the invention relates to robust detection and localization of liquid leaks.

BACKGROUND OF THE INVENTION

Many processes and applications rely heavily on the use of liquids. Liquids are typically stored in tanks, such as reserving tanks, and are transported from such reserving tanks to process stations where they are required by way of piping lines.

It is desirable in any storage, transportation or process use of fluids to be aware of any tank or plumbing fluid leaks or breaches. Even minimal fluid leaks can be detrimental, not only from a material loss standpoint, but also from the standpoint of environmental and safety considerations if such fluids happen to be hazardous materials.

A variety of fluid leak detection schemes are known. For example, so-called differential pressure techniques may be used to detect the existence of leaks in a tank or piping. However, such techniques generally fail to identify localization of a leak and may have difficulty if not total inability to detect the existence of very small leaks. Furthermore, such techniques may experience significant time lag between when a leak first occurs and when the leak is detected rendering such detection techniques undesirable in time critical leak detection applications.

Piping and tank leaks may also be detected by way of discrete, uninsulated electrode pair placements wherein a fluid leak that causes the fluid to bridge the electrodes is detected as a short across the electrodes or as a significant change in the resistance between the electrodes. The fact that such a technique uses exposed or uninsulated electrodes may be problematic in applications using flammable fluids as they represent a potential ignition source.

Certain other techniques have been proposed which utilize a coaxial conductor cable wherein the dielectric layer that is intermediate the solid central and braded exterior conductors is porous. Infiltration of the fluid from a leak to be detected into the porous intermediate layer causes a substantial change in the permitivity of the layer at the infiltrated location. Pulse reflection distortion techniques are then utilized to detect the presence and location of the leak. This proves to be a solution requiring expensive and sophisticated electronics for generating and interpreting signals. Furthermore, it is recognized that such techniques may be slow to detect leaks due to wicking effects of the braided outer layer which slows the infiltration of the leaked fluid through the porous intermediate layer and may distribute the liquid over a exceptionally long length of the cable.

Yet another option in fluid leak detection is disclosed in commonly assigned and co-pending U.S. patent application Ser. No. 09/881,389, Attorney Docket No. 67,200-438. In that application, a thermal sensing fluid leak detection scheme is described. Temperature changes in the detector due to fluid contact are detected in such a scheme. While the invention described therein is regarded as an improvement over the prior art, it may not meet all requirements of certain fluid leak detection applications. For example, a plurality of such individual thermal leak detection apparatus may be required to adequately canvas an area of interest for the purpose of leak detection. Even then, the granularity of localizing the source of such leaks may be greater than that desired in a particular application.

SUMMARY OF THE INVENTION

Therefore, it is one object of the present invention to detect the existence of fluid leaks.

It is a further object of the present invention to localize such detected fluid leaks.

It is a further object of the present invention to accomplish the detection and localization of fluid leaks quickly after such a fluid leak ensues without delay.

It is yet a further object of the present invention to provide localization of such fluid leaks in accordance with a continuous sensor element and effectively only limited by the resolution afforded by the sensing electronics.

It is yet a further object of the present invention to provide for such a fluid leak detection system that has an additional visual indication of the existence and localization of a fluid leak.

In accordance with these and other objects and advantages, the present invention comprises a pair of electrical conductors located in relative proximity to a fluid vessel, the pair of electrical conductors comprising at least one insulated conductor characterized by an electrically insulative, porous sheath. Circuitry coupled to said electrical conductors is effective to measure resistance of the combination of the pair of electrical conductors and an electrical short there between caused by a liquid leak, whereby the resistance indicates the existence of a leak and the relative location of the leak along said at least one insulated electrical conductor.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1A:
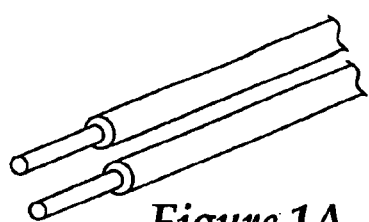
FIG. 1A illustrates a pair of single element conductors arranged in parallel adjacency suitable for implementation of the present invention.

When used herein, the term conduit shall be understood to mean any piping, plumbing, manifolding or the like generally used for the transportation, mixing or movement of liquid from one location to another. When used herein, the term tank shall be understood to mean any tank, container or the like generally used for long term or short term, open or closed, storage or containment of liquid. When used herein, the term vessel shall be understood to mean either a tank or conduit.

The present invention has particularly beneficial utility in application to leak detection in so called wet processing in the semiconductor industry. However, the invention is not so limited in application and while references may be made to such wet bench applications to illustrate the technology and benefits of such a system, the invention is more generally applicable to leak detection in a variety of industrial and product applications.

Advanced logic integrated circuits are fabricated using in excess of 300 fabrication steps. About 50 of those steps may involve some type of wet processing. Wet processing steps may generally be categorized into one of three areas; critical cleaning, critical etching and photoresist stripping. Conventional wet bench equipment may include fourteen or more storage tanks, a plurality of working tanks (e.g. reaction chambers, such as baths) wherein electronic component precursors (i.e. in process wafers) are exposed to various liquids, and a variety of plumbing conduits including valves, filters, recirculators and injection manifolds for the intermixing of a liquid carrier stream and various process liquids. Additionally, wet bench equipment may employ processors such as personal computers, programmable logic controllers (PLCs), or embedded processors. The processing system may also include one or more controllers. Suitable controllers for use in the present invention include for example the processors previously described.

Many of the process liquids are hazardous. Integrity of the fluid system is therefore a major consideration for the integrated circuit manufacturer. When leaks do occur, it is imperative that it be detected and that the source of the leak be located without delay. Process liquids are generally stored in tanks in a concentrated form and diluted to a usable concentration in an injection manifold. These process liquids include, without limitation, aqueous solutions of hydrochloric acid and buffers comprising the same, ammonium hydroxide and buffers comprising the same, hydrogen peroxide, sulfuric acid and buffers comprising the same, mixtures of sulfuric acid and ozone, hydrofluoric acid and buffers comprising the same, chromic acid and buffers comprising the same, phosphoric acid and buffers comprising the same, acetic acid and buffers comprising the same, nitric acid and buffers comprising the same, ammonium fluoride buffered hydrofluoric acid, solutions of sulfuric acid with ozone, sulfuric acid and ozone and/or hydrogen peroxide, inorganic acids such as sulfuric acid, nitric acid, chromic acid, and phosphoric acid, and hydrogen peroxide. Various drying fluids including alcohols such as methanol, ethanol, 1-propanol, isopropanol, n-butanol, secbutanol, tertbutanol, or tert-amyl alcohol, acetone, acetonitrile, hexafluoroacetone, nitromethane, acetic acid, propionic acid, ethylene glycol mono-methyl ether, difluoroethane, ethyl acetate, isopropyl acetate, 1,1,2-trichloro-1,2,2-trifluoroethane, 1,2-dichloroethane, trichloroethane, perfluoro-2-butyltetrahydrofuran, perfluoro-1,4-dimethylcyclohexane or combinations thereof may also be employed in a wet bench. No distinction is made herein between process liquids and drying liquids.

Figure 2:
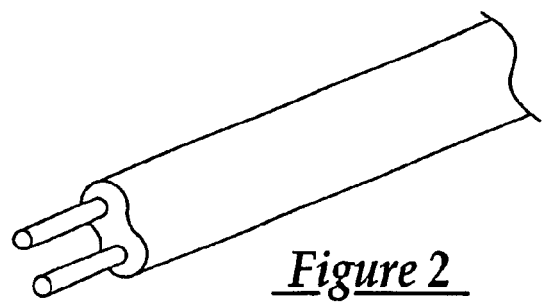
FIG. 2 illustrates a dual element conductor suitable for implementation of the present invention.
Figure 5:
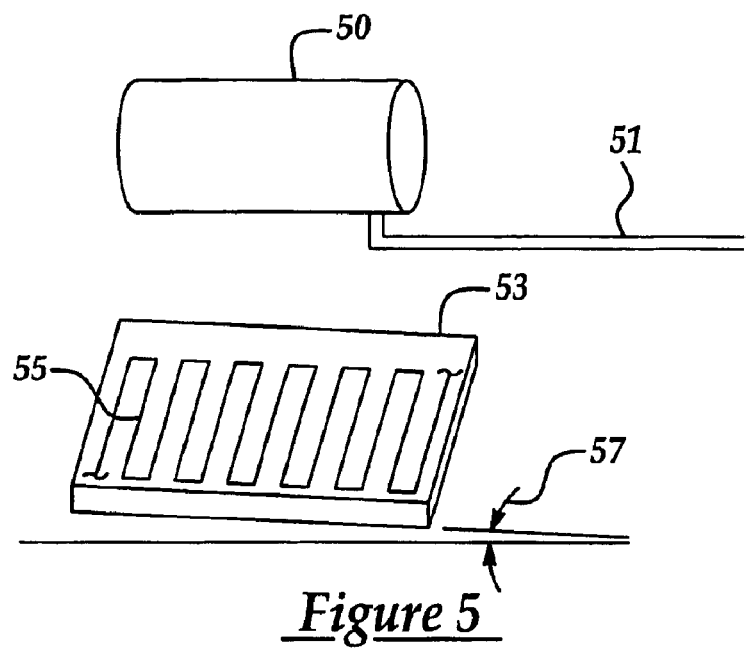
FIG. 5 is an alternate exemplary utilization of a leak detection system for a liquid vessel in accordance with the present invention.

According to the present invention, detection of a liquid leak from a tank is exemplified in FIG. 5. Tank 50 is illustrated having a substantially cylindrical shape though any regularly or irregularly shaped tank may be employed. Tank 50 contains a liquid which may be transported via conduit 51. Beneath tank 50 in relative proximity thereto is drip tray 53, the general purpose of which is to contain any leak from tank 50 above. Disposed along the bottom of drip tray 53 is sensing wire 55. Sensing wire 55 may comprise a single conductor or double conductors. Double conductors may take the form of a pair of individually insulated conductors that are arranged adjacent one another, preferably in parallel adjacency, as illustrated in FIG. 1A. The adjacency may be immediate or spaced. Double conductors may also take the form of integrally insulated parallel conductors as illustrated in FIG. 2. Embodiments of the invention utilizing double conductors will be taken up immediately while discussion of single conductor embodiments will be taken up later in conjunction with FIGS. 8A and 8B.

Figure 1B:
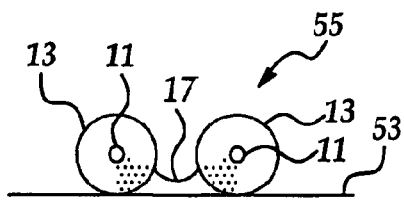
FIG. 1B is a sectional view through a pair of electrically shorted single element conductors arranged in parallel adjacency suitable for implementation of the present invention.

A section through a double conductor sensing wire 55 comprising a pair of individually insulated conductors is illustrated in FIG. 1B and corresponds to the section line indicated in FIG. 5. FIG. 1B is also useful in further understanding important aspects of the present invention. Features of the sensing wire 55 are exaggerated for clarity. Each conductor comprises an internal conductor wire 11 and an outer insulation or sheath 13. Sheath 13 comprises an electrically insulative but porous material. For example, Teflon® is a preferred material. Though the section of FIG. 1B shows a relatively thick sheath, thinner sheaths have the characteristic advantage of quicker penetration of fluid.

As arranged in the embodiment of FIG. 5, the conductors lie against the bottom of drip tray 53. As shown in FIG. 5, the sensing wire 55 is laid out in a sinuous or zigzag pattern for the purpose of substantially evenly distributing the double conductor sensing wire 55 over the majority of the bottom of drip tray 53. The tighter the pattern the less granular the resolution of the leak location aspect of the invention. If a leak occurs, the fluid will eventually bridge a section of the sensing wire 55 between two adjacent individually insulated conductors. Such fluid bridging is labeled 17 in FIG. 1B. The portions of the sheaths 13 appearing mottled or dotted represents absorbed fluid 17. The bridged fluid 17 effectively provides an electrical current path at a point in the run of sensing wire 55. The ionic nature of the fluid makes this current path an effective short between the conductors. The presence and location of such a fluid short along the sensing wire may be inferred by monitoring electrical parameters of the sensing wire as described later.

Additionally, the sensing wire 55 may be treated chemically to provide a visual indication of its contact with a fluid. For example, the sheath may be coated with copper sulfate ($CuSO_4$) or copper sulfate may be intermixed with the sheath material prior to overmolding on the conductor 11. A mixture of 5% to 40% of copper sulfate to Teflon® has proven to be an acceptable formulation. Copper sulfate in the presence of water will crystallize and turn blue. Since most of the fluids in a wet bench are water diluted, contact of such fluids with the sensing wire 55 so treated will provide a visual indicator of the location of the leak. An additional benefit of such treatment for visually indicating a leak is that commonly used deionized water has significantly higher resistivity than do the other process fluids, and a leak of the deionized water may be difficult to detect electrically.

FIG. 5 also illustrates drip tray 53 having a slight pitch 57 from horizontal. Such a pitch may reduce time to detection of smaller or slower leaks by allowing the fluid to trickle toward a section of the sensing wire as opposed to pooling and accumulating for a period of time sufficient to passively reach the sensing wire.

The integrally insulated parallel conductors as illustrated in FIG. 2 may be substituted for the pair of individually insulated conductors previously described. Fluid absorption into the sheath thereof will operate in the same manner to bridge the conductors therein.

Figure 6:
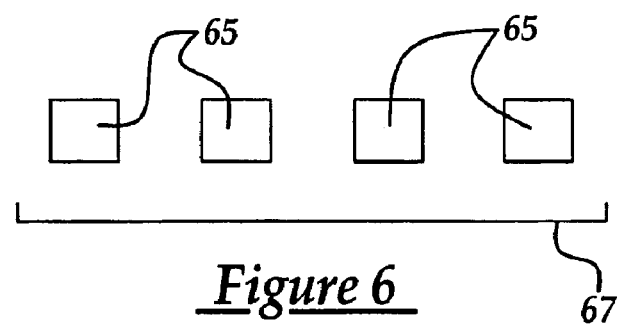
FIG. 6 is a schematic exemplary utilization of a leak detection system for multiple liquid vessels in accordance with the present invention.

Semiconductor manufacturing typically employs a dozen or more tanks having a variety of process fluids per piece of wet bench equipment. The schematic of FIG. 6 illustrates the applicability of the invention to leak detection of a plurality of tanks 65. In that Figure, tanks 65 are above a single drip tray 67 configured similar to the description of drip tray 53 below a single tank in FIG. 5.

Figure 7:
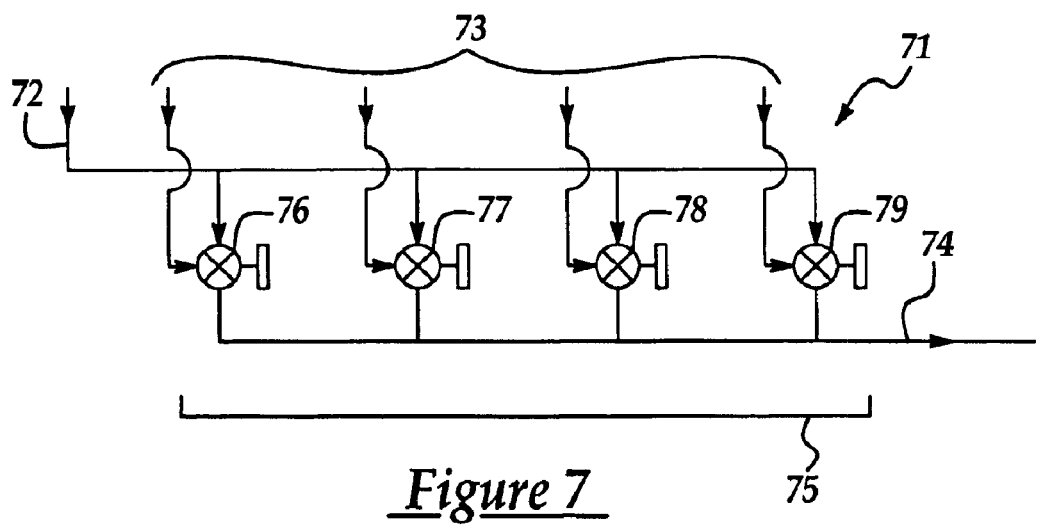
FIG. 7 is a schematic exemplary utilization of a leak detection system for a liquid injection manifold in accordance with the present invention.

Similarly, a trayed system has applicability to leak detection at an injection manifold 71 as exemplified schematically in FIG. 7. Injection manifold 71 comprises a deionized water inlet 72 and a process or working fluid outlet 74. There between is located a bank of mixing valves 76–79 which receive the deionized water from inlet 72 and process fluids from a corresponding plurality of process fluid inlets 73. Drip tray 75 is equipped as generally described previously with a sensing wire for the detection of the presence and location of a fluid leak from the manifold 71.

Figure 3A:
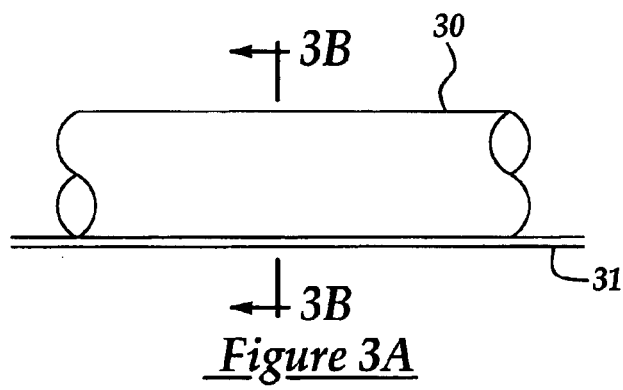
FIG. 3A is an exemplary utilization of a leak detection system for a liquid tank or conduit in accordance with the present invention.
Figure 3B:
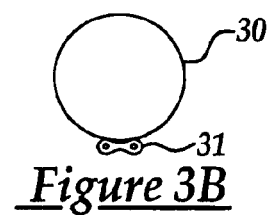
FIG. 3B is a sectional view taken as indicated through the leak detection system for a liquid tank or conduit of FIG. 3A in accordance with the present invention.

FIGS. 3A and 3B illustrate another application of the present invention in detecting leaks that is particularly well suited to conduit runs but which may be applicable to a tank also. Conduit 30 has contained therein and flowing therethrough a fluid. The underside of the conduit, substantially at the lowest surface thereof, is sensing wire 31. Preferably, sensing wire 31 comprises integrally insulated parallel conductors as illustrated in FIG. 2. Sensing wire 31 is in surface contact with conduit 30 and may be held in place by any of a variety of means including adhesives, clips, or wire ties or wraps. FIG. 3B is a sectional view taken along the section line illustrated in FIG. 3A. Surface tension of the fluid will, particularly in the event of a slow leak from conduit 30, result in the fluid trickling along the profile of the conduit to the underside thereof whereat sensing wire 31 is strategically place to sense the leak as previously described. Underside application of sensing wire 31 to a tank is, as alluded to above, an additional application of this sensing technology.

Figure 4A:
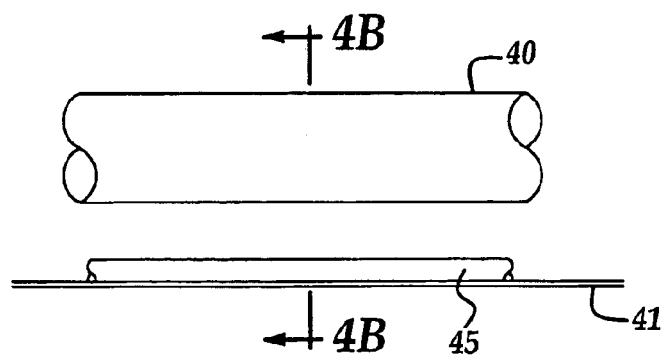
FIG. 4A is an alternate exemplary utilization of a leak detection system for a liquid tank or conduit in accordance with the present invention.
Figure 4B:
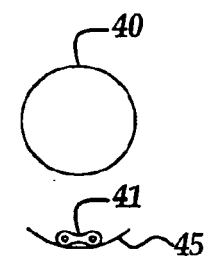
FIG. 4B is a sectional view taken as indicated through the leak detection system for a liquid tank or conduit of FIG. 4A in accordance with the present invention.

FIGS. 4A and 4B illustrate yet another application of the present invention in detecting leaks that is particularly well suited to conduit runs. In this instance, conduit 40 carrying a liquid is located above a trough 45 similar in function to a fluid containing drip tray as described earlier herein. Placed on the upper side of trough 45 is sensing wire 41. Leaks from conduit 40 above trough 45 are likely to drip off of conduit 40 into trough 45 below and be sensed as previously described by sensing wire 41. FIGS. 4A and 4B illustrate a single conduit 40; however, a plurality of adjacent or bundled conduits may similarly be placed above a trough in similar fashion.

Figure 8A:
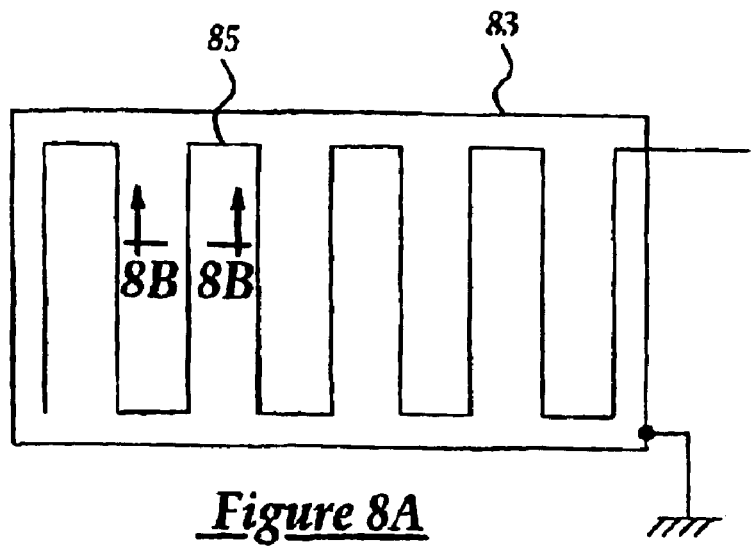
FIG. 8A is a schematic plan view of an alternate leak detection system in accordance with the present invention.
Figure 8B:
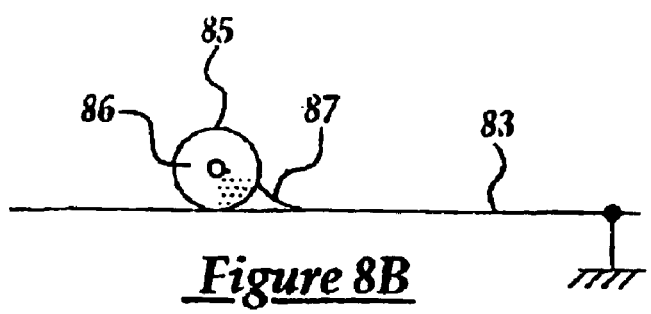
FIG. 8B is a sectional view taken as indicated through the leak detection system of FIG. 8A in accordance with the present invention.

A single conductor embodiment of the present invention is illustrated in FIGS. 8A and 8B. In FIG. 8A, a plan view of a drip tray 83 is shown. Sensing wire 85 is, similar to the embodiment described corresponding to FIG. 5, laid out in a sinuous or zigzag pattern for the purpose of substantially evenly distributing the single conductor sensing wire 85 over the majority of the bottom of drip tray 83. FIG. 8B is a sectional illustration taken through the section line as shown in FIG. 8A. Single conductor sensing wire 85 has sheath 86 comprising an electrically insulative but porous material. Drip tray 83 is electrically conductive and is preferably characterized by a resistivity that is low as compared to the resistivity of the sensing wire. Drip tray 83 is also shown to be electrically grounded. In this embodiment, drip tray 83 provides a portion of the electrical circuit needed to determine the presence and location of a fluid leak by the sensing wire 85. A fluid leak bridging the sensing wire 85 and the drip tray 83 is labeled 87 in FIG. 8B. The portion of the sheath 86 appearing mottled or dotted represents absorbed fluid 87. The bridged fluid 87 effectively provides an electrical current path between the sensing wire 85 and drip tray 83 at a point in the run of sensing wire 85. The ionic nature of the fluid makes this current path an effective short between the sensing wire 85 and the drip tray 83. The presence and location of such a fluid short along the sensing wire may be inferred by monitoring electrical parameters of the sensing wire as described below.

Figure 9:
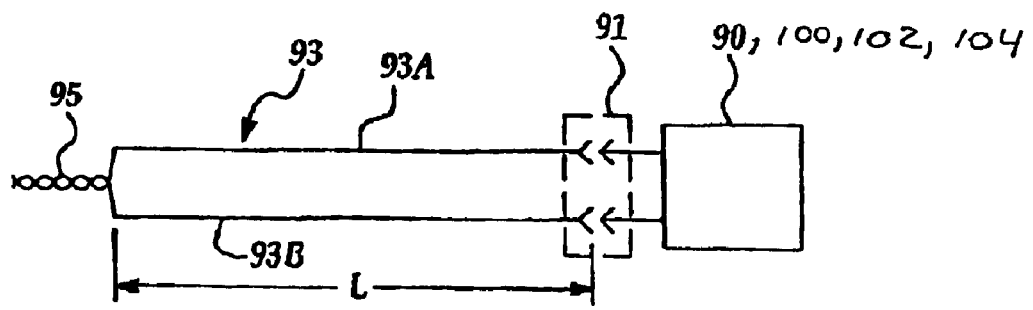
FIG. 9 is a schematic diagram of a liquid leak detection system in accordance with the present invention.

FIG. 9 illustrates schematically the basic electrical aspects of the various embodiments of the invention as described above and as further described to follow. Sensing wire is labeled 93 in FIG. 9 and comprises first and second electrical conductors 93A and 93B. In the double conductor embodiments described, conductors 93A and 93B comprise a double conductor sensing wire. Conductors 93A and 93B in a double conductor embodiment are substantially equivalent lengths. Node 95 at the distal or remote end of the sensing wire 93 is schematically illustrated as a simple twisted connection but may be any electrical termination that short circuit couples the two conductors 93A and 93B such as soldered leads, terminal blocks, insulation displacement splice, etc. The proximal or local end of the sensing wire is coupled such as by a connector 91 to control and sense circuitry 90.

In the case of a single conductor embodiment described, conductor 93A comprises a single conductor sensing wire. Conductor 93B comprises a conductive drip tray or other conductor which, in the event of a liquid leak, provides a low resistance ground terminal coupled to the distal end of the conductor 93A such as by a grounding terminal or by otherwise sharing a common ground with the control and sense circuitry 90.

Control and sense circuitry may comprise an ohmmeter which measures simple resistance. In a double conductor embodiment of the invention wherein the sensing wire has a length of substantially L, the resistance reading R would be substantially in accordance with the following formula.

$$R = r*l/A \tag{1}$$

This is the general formula for resistance in a conductor where r is the electrical resistivity of the sensing wire conductor material, A is the area of the cross section of the conductor and l is the length of the conductor. Receptivity r may vary significantly with the choice of conductor material, for example copper has a resistivity at 20 C of substantially $1.7 \times 10^{-8}$ ohm*m whereas nichrome has a resistivity at 20 C. of substantially $100 \times 10^{-8}$ ohm*m. The maximum resistance R expected in a double conductor sensing wire embodiment is equal to $$r*2L/A \qquad (2)$$

where no leaks bridge the conductors and, in accordance with the same relationship, the minimum resistance R expected in a double conductor sensing wire embodiment is substantially equal to zero where a leak bridges the most extreme proximal end of the sensing wire. The value of the sensing wire resistance R varies proportionally between zero and the maximum in accordance with the linear distance of a leak bridging the sensing wire as measured from the proximal end thereof. Of course a normal condition where the distal end of the sensing wire is short circuited as described will be a resistance R in accordance with the maximum expected as described above. A leak bridging the sensing wire at a distance of substantially one-half of the length L will result in a resistance reading of substantially one half of the maximum resistance. A leak bridging the sensing wire so described will similarly provide a resistance reading that is in direct proportion to the leak's location along the sensing wire.

Alternatively, the node 95 may be eliminated and the pair of conductors of the sensing wire allowed to float. Liquid bridging the conductors at the distal end will result in a maximum resistance reading while liquid bridging the conductors at the proximal end will result in a minimum resistance reading of substantially zero. A leak bridging the sensing wire will similarly provide a resistance reading that is in direct proportion to the location along the sensing wire.

In a single conductor embodiment, the results are similarly obtained. The fact that the drip tray may be of dissimilar metal from that of the sensing wire can be made an insignificant distinction where the sensing wire is characterized by a substantially higher resistance than the drip tray contributes thereby rendering the drip tray resistance contribution negligible. Hence, the resistance measured will vary from a maximum to a minimum of substantially zero in direct proportion to the location of the bridging leak along the sensing wire.

It may be desirable to have a sensing wire to provide, for a given length of sensing wire, a relatively substantial resistance. Leak location resolution may be improved thereby and less sensitive circuitry may be employed. The profile or gauge of wire selected can provide some flexibility in this regard with smaller diameter wires providing a greater per unit resistance. Alternatively or in conjunction, the material selection plays an important role. As between the two examples of conductors given above, copper and nichrome, all else being equal nichrome will provide a resistance per unit length that is substantially 100/1.7 times greater than copper.

Additionally, a relatively high resistance wire in a single conductor embodiment wherein the grounded drip tray has significantly lower resistance provides another alternative. Similarly, a double conductor sensing wire may comprise dissimilar conductor material choices—one of a significantly higher resistivity than the other.

Finally, while the circuitry for reading the resistance has been described as an ohmmeter 90 which returns a reading that is related to the linear location of a detected leak along the sensing wire, alternative circuitry is also envisioned. For example, the ohmmeter readout may be directly translated to a location or region readout (not shown) for convenience of the operator or servicing technician. Personal computers 100, programmable logic controllers (PLCs) 102, or embedded processors 104 as commonly employed in wet bench apparatus may be employed to provide the function of an ohmmeter or equivalent. For example, a predetermined current provided to the sensing wire and a voltage sensing circuit provide voltage and current quantities in the sensing wire that may be used to calculate the resistance and hence the position of a liquid leak or more directly to determine the existence and location of a fluid leak directly from the sensed voltage and predetermined current. Alternatively, a predetermined voltage provided to the sensing wire and a current sensing circuit will also provide voltage and current quantities in the sensing wire that may be used to calculate the resistance and hence the position of a liquid leak or more directly to determine the existence and location of a fluid leak directly from the sensed current and predetermined voltage.

The invention has been described with respect to certain preferred embodiments intended to be taken by way of example and not by way of limitation. Certain alternative implementations and modifications may be apparent to one exercising ordinary skill in the art. Therefore, the scope of invention as disclosed herein is to be limited only with respect to the appended claims.

The invention in which an exclusive property or privilege is claimed are defined as follows.

What is claimed is:

1. An apparatus for detecting a liquid leak from a fluid vessel comprising:

a pair of electrical conductors located in relative proximity to said fluid vessel, said pair of electrical conductors comprising at least one electrical conductor characterized by an electrically insulative, porous sheath effective to provide electrical isolation of said at least one electrical conductor from the other electrical conductor;

circuitry coupled to said electrical conductors effective to measure a resistance of the combination of the pair of electrical conductors and an electrical short therebetween caused by local conductivity through the porous sheath at a location whereat said liquid leak penetrates said sheath, whereby the resistance indicates the existence of a leak and the relative location of the leak along said at least one electrical conductor, wherein the liquid leak is ionic in nature; and a drip tray wherein said at least one insulated conductor resides, and wherein the drip tray further has a portion of a circuit needed to determine a presence and a location of said leak, wherein said drip tray is electrically conductive, and wherein said drip tray is electrically grounded.

2. The apparatus as claimed in claim 1 further comprising a drip tray wherein said at least one insulated conductor resides.

3. The apparatus as claimed in claim 2 wherein said pair of electrical conductors comprises a second insulated conductor characterized by an electrically insulative, porous sheath, said pair of electrical conductors being in parallel adjacency.

4. The apparatus as claimed in claim 2 wherein said pair of electrical conductors comprises said drip tray.

5. The apparatus as claimed in claim 3 wherein said pair of electrical conductors comprises individually insulated conductors.

6. The apparatus as claimed in claim 3 wherein said pair of electrical conductors comprises integrally insulated conductors.

7. The apparatus as claimed in claim 1 wherein the circuitry comprises an ohmmeter.

8. The apparatus as claimed in claim 1 wherein the circuitry comprises a voltage source and a current sensing circuit.

9. The system according to claim 1 wherein the circuitry comprises a current source and a voltage sensing circuit.

10. The apparatus as claimed in claim 1 wherein the said at least one insulated conductor comprises a chemically treated insulator which changes color when contacted by liquid, whereby leak existence and location may be discerned visually.

11. The apparatus as claimed in claim 10 wherein the insulator is chemically treated with copper sulfate.

12. The apparatus as claimed in claim 10 wherein said at least one insulated conductor comprises nichrome.

13. A method for determining existence and location of a fluid leak from a vessel comprising:
  providing a pair of electrical conductors in proximity to said vessel, at least one if said pair of electrical conductors being elongated and having a sheath comprising an electrically insulative, porous material;
  providing a drip tray wherein said pair of electrical conductors resides, and wherein the drip tray further has a portion of a circuit needed to determine a presence and a location of said leak, wherein said drip tray is electrically conductive, and wherein said drip tray is electrically grounded;
  determining a resistance between said at least one of said pair of electrical conductors and said other electrical conductor; and
  relating said resistance to one of a normal condition corresponding to the absence of a fluid induced electrical short between said pair of electrical conductors or a leak condition corresponding to the presence of an ionic fluid induced electrical short between said pair of electrical conductors, and further relating said resistance corresponding to a leak condition to a location along the at least one of said pair of electrical conductors.

14. The method as claimed in claim 13 wherein both of said pair of electrical conductors comprise elongate conductors having a sheath comprising an electrically insulative, porous material.

15. The method as claimed in claim 13 wherein the step of determining a resistance between said at least one of said pair of electrical conductors and said other electrical conductor includes measuring a resistance with an ohmmeter.

16. The method as claimed in claim 13 wherein the step of determining a resistance between said at least one of said pair of electrical conductors and said other electrical conductor comprises:
  providing a predetermined current to the pair of electrical conductors; and
  measuring a voltage through said pair of electrical conductors corresponding to said predetermined current.

17. The method as claimed in claim 13 wherein the step of determining a resistance between said at least one of said pair of electrical conductors and said other electrical conductor comprises:
  providing a predetermined voltage to the pair of electrical conductors; and
  measuring a current through said pair of electrical conductors corresponding to said predetermined voltage.

18. A method for determining existence and location of a fluid leak from a vessel comprising:
  providing a pair of electrical conductors in proximity to said vessel, at least one of said electrical conductors being elongate and having a sheath comprising an electrically insulative, porous material;
  providing a drip tray wherein said pair of electrical conductors resides, wherein the drip tray further has a portion of a circuit needed to determine a presence and a location of said leak, wherein said drip tray is electrically conductive, and wherein said drip tray is electrically grounded;
  providing one of a predetermined voltage and current to said pair of electrical conductors;
  measuring the other one of a voltage and current not provided to said pair of electrical conductors; and
  determining from said provided one of a predetermined voltage and current and said measured other one of voltage and current not provided the existence and location of an ionic fluid induced electrical short between said pair of conductors.

19. The method as claimed in claim 18 wherein the step of determining the existence and location of a fluid induced electrical short between said pair of conductors comprises measuring a resistance.

20. The method as claimed in claim 19 wherein the resistance is measured with an ohmmeter.

21. The method as claimed in claim 18 wherein the step of determining the existence and location of a fluid induced electrical short between said pair of conductors comprises the use of one of a personal computer, programmable logic controller, and embedded processor.

22. The apparatus as claimed in claim 2, wherein the at least one insulated conductor comprises:
  a sensing wire laid out in a zigzag pattern over a majority of the drip tray.

* * * * *